United States Patent [19]
Dang et al.

[11] Patent Number: 5,631,785
[45] Date of Patent: May 20, 1997

[54] AUTOMATED DATA STORAGE LIBRARY EMPLOYING PICKER WITH MULTIPLE ACTION DIRECTIONS

[75] Inventors: Chi H. Dang; Chi T. Dang, both of Tucson, Ariz.

[73] Assignee: International Business Machines Corporation, Armonk, N.Y.

[21] Appl. No.: 532,028

[22] Filed: Sep. 21, 1995

Related U.S. Application Data

[63] Continuation of Ser. No. 147,228, Nov. 3, 1993, abandoned.
[51] Int. Cl.⁶ .............................. G11B 15/68; G11B 5/48
[52] U.S. Cl. ........................... 360/92; 369/192; 369/36
[58] Field of Search ...................... 360/92, 94, 98.04; 369/36, 38–39, 178–179, 192–193; 414/277, 278, 280, 751

[56] References Cited

U.S. PATENT DOCUMENTS

| | | | |
|---|---|---|---|
| 4,484,239 | 11/1984 | Timm | 360/92 |
| 4,601,386 | 7/1986 | Antonello | 360/92 |
| 4,772,968 | 9/1988 | Nonaka et al. | 360/92 |
| 4,827,463 | 5/1989 | Motoyoshi et al. | 369/36 |
| 4,839,758 | 6/1989 | Honjoh | 360/99.06 |
| 4,910,619 | 3/1990 | Suzuki et al. | 360/92 |
| 4,991,041 | 2/1991 | Grant | 360/92 |
| 5,036,503 | 7/1991 | Tomita | 360/92 |
| 5,043,962 | 8/1991 | Wanger et al. | 369/36 |
| 5,146,375 | 9/1992 | Satoh et al. | 360/92 |
| 5,220,548 | 6/1993 | Nakatsukasa et al. | 369/36 |
| 5,285,333 | 2/1994 | Barr et al. | 360/92 |
| 5,293,284 | 3/1994 | Sato et al. | 360/92 |

*Primary Examiner*—Stuart S. Levy
*Assistant Examiner*—Brian E. Miller
*Attorney, Agent, or Firm*—Baker, Maxham, Jester & Meador

[57] ABSTRACT

An automated data storage library of unique design includes a plurality of storage cell magazines containing storage cells for holding storage media cartridges therein. A picker mechanism having multiple direction capability is positioned for accessing and transporting the storage media cartridges between at least three adjacent storage cell magazines. The picker mechanism includes a pair of gripper pickers configured for releasably gripping and supporting the storage media cartridges during transport between the storage cells. The picker mechanism is rotatable so that one of the grippers can be utilized to access two of the adjacent storage cell magazines while the second gripper accesses the third storage cell magazine. For increased efficiency, the picker mechanism can be positioned between opposing columns of storage cell magazines together with a single storage cell column at one end. Plural picker mechanisms can also be positioned between adjacent sets of storage cell magazines having three adjacent storage cell magazines each. Still further, the picker mechanism could be positioned to access a peripheral storage device in communication with a host processor, together with a pair of rotatable cartridge carousels containing plural storage cell magazines.

6 Claims, 8 Drawing Sheets

AUTOMATED DATA STORAGE LIBRARY EMPLOYING PICKER WITH MULTIPLE ACTION DIRECTIONS

This application is a continuation of application Ser. No. 08/147,228, filed Nov. 3, 1993 now abandoned.

BACKGROUND OF THE INVENTION

The present invention relates to automated data storage libraries for storing and retrieving cartridges with data storage media therein, for use by data processing apparatus having access to such libraries.

Automated data storage libraries provide a data storage environment in which large quantities of data are distributed between a plurality of discrete data storage elements, such as magnetic tape or optical disk cartridges, which are placed in addressable storage cell locations arranged in one or more storage cell banks. The storage elements are accessed using positionable cartridge picker mechanisms which may include one or more selectively operable cartridge grippers.

In order to transport a data storage element between storage cell locations, one of which may contain a data read/write unit in communication with a host data processing system, a picker mechanism is first positioned at a source storage cell containing a data storage element to be retrieved. A gripper is activated to engage the storage element and retract it from the storage cell. The picker mechanism is then positioned at a destination cell and the gripper is again activated to insert the storage element in the storage cell and release it.

Data storage libraries have been proposed in which single direction pickers are used to access columns of cartridge magazines from a single side. The storage cartridges are picked at one end that is opposite to the cartridge opening or shuttle door. This picker arrangement has the capability to reach only one cartridge at a time from one fixed position. Applicant has proposed a data storage library using a pass through picker that can reach multiple cartridges on opposing sides of the picker (180 degree picking) without changing its position, which opens the possibility of extendable library architectures involving a combination of dual-opening storage cells and duel cell pickers.

It is submitted that further advantage could be derived from a data storage library that is extendable by its capability to provide 180 degree picking, yet which also has the ability to function as an end picker in order to serve additional storage cells without having to be repositioned. Adding repositioning capability to this arrangement would permit access to still more storage cell configurations. What is required is a system of reduced complexity and cost in which configuration flexibility is maximized and data storage and retrieval times are effectively minimized.

SUMMARY OF THE INVENTION

In accordance with the foregoing objectives, an automated data storage library of unique design is provided. The data storage library includes a plurality of storage cell magazines containing storage cells for holding storage media cartridges therein. A picker mechanism having multiple direction capability is positioned for accessing and transporting the storage media cartridges between at least three adjacent storage cell magazines. The picker mechanism includes a pair of gripper pickers configured for releasably gripping and supporting the storage media cartridges during transport between the storage cells. The picker mechanism is rotatable so that one of the grippers can be utilized to access two of the adjacent storage cell magazines while the second gripper accesses the third storage cell magazine. For increased efficiency, the picker mechanism can be positioned between opposing columns of storage cell magazines together with a single storage cell column at one end. Plural picker mechanisms can also be positioned between adjacent sets of storage cell magazines having three adjacent storage cell magazines each. Still further, the picker mechanism could be positioned to access a peripheral storage device in communication with a host processor, together with a pair of rotatable cartridge carousels containing plural storage cell magazines.

BRIEF DESCRIPTION OF THE DRAWINGS

The objects, features and advantages of the invention will be more easily understood when considered in light of the following derailed description, together with the accompanying drawing figures, in which.

DETAILED DESCRIPTION OF THE PREFERRED EMBODIMENTS

Figure 1:
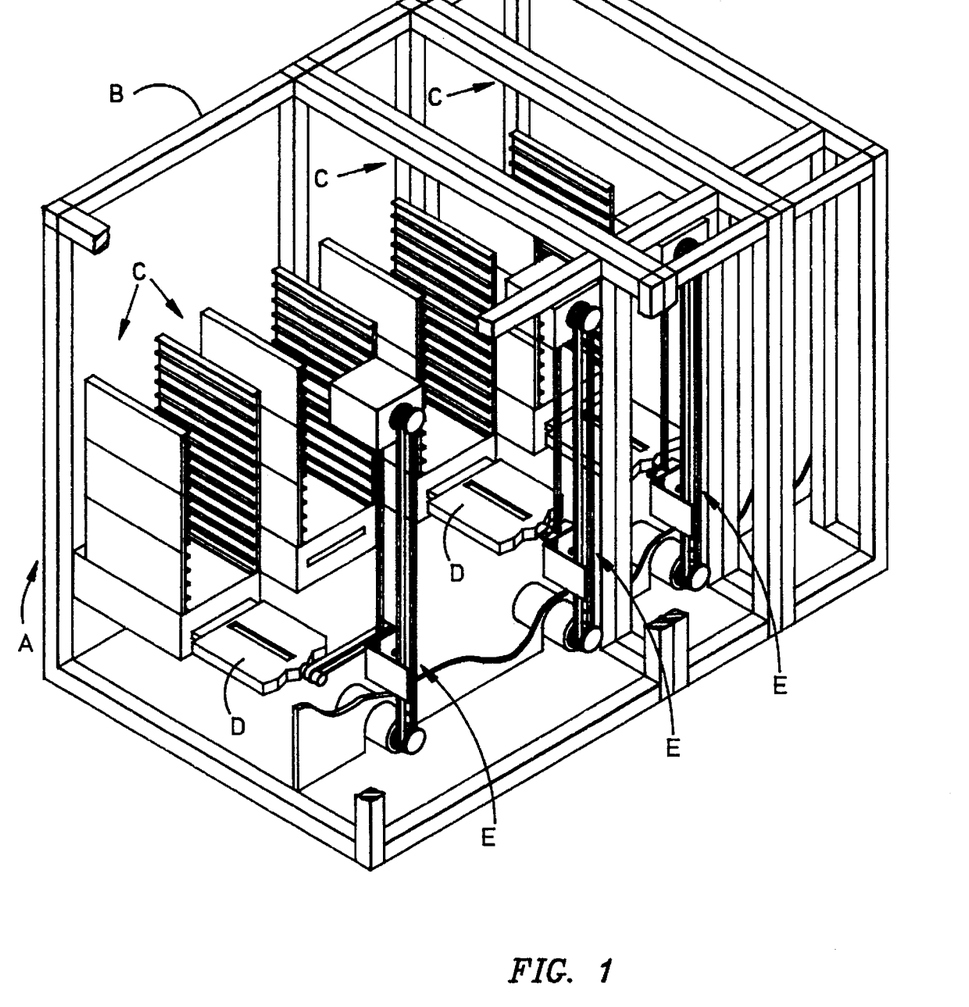
FIG. 1 is a perspective view of an automated dam storage library.

Referring now to FIG. 1, a data storage library A illustrates a general configuration and construction which may be used to implement preferred embodiments of the present invention. The data storage library A includes a frame or housing B that supports a plurality of storage cell magazines C. The storage cell magazines C are formed as vertical columns of storage cells configured to hold storage media cartridges (containing, e.g., optical or magnetic disks) therein. The storage cell magazines C preferably include a peripheral read/write storage device (e.g., an optical disk drive) positioned below the storage cells. The peripheral storage devices are connected for communication with one or more host data processing systems (not shown). The storage cell magazines C are accessed by picker mechanisms D that are mounted on vertical drive mechanisms E. The picker mechanisms are vertically positionable and controllable to selectively retrieve and transport storage media cartridges between storage cells.

The data storage library A could be the size of a personal computer or could be much larger depending on user requirements. Moreover, the data storage library A could be modular in nature so that plural data storage libraries could be physically combined for sharing storage media cartridges therebetween. The storage media cartridges could be of any conventional type including magnetic tape cassettes for serial access archive purposes and optical disk cartridges for more direct access storage applications. It will also be understood that the data storage library A could be used with a variety of data processing host devices including stand-alone and networked personal computers, work stations, mid-range computer systems and main frame systems.

Figures 2, 3:
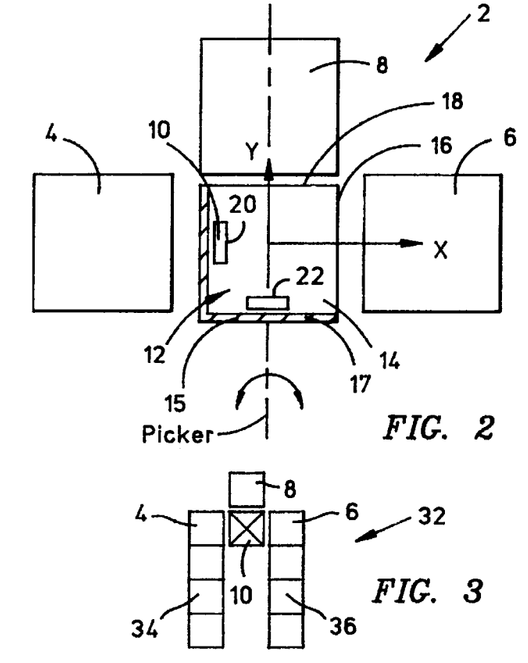
FIG. 2 is a plan view of a picker mechanism with multiple direction capability constructed in accordance with the present invention.
FIG. 3 is a plan view of a data storage library utilizing the picker mechanism of FIG. 2.

Referring now to FIG. 2, a data storage library 2 constructed in accordance with the present invention is adapted for mounting in a storage library frame or housing such as the frame or housing B of FIG. 1. The data storage library 2 includes plural storage cell magazines 4, 6 and 8 formed as vertical columns of storage cells stacked in the "z" axis direction of FIG. 2. The storage cells of each storage cell magazine are configured for retaining storage media cartridges therein. At least one of the storage cell magazines, designated for example by reference number 8 in FIG. 2, preferably possesses high performance capability or holds one or more peripheral storage devices in communication with one or more host data processing systems. The peripheral storage devices would thus be conveniently positioned for receiving storage media cartridges from other storage cell locations and for readily accessing the data therein. The storage media cartridges could be of any conventional type including magnetic tape cassettes and optical disk cartridges.

The storage cell magazines 4, 6 and 8 are arranged for operation with a cartridge picker mechanism 10 positioned for accessing the storage cells of the storage cell magazines and for transporting storage media cartridges therebetween. The cartridge picker mechanism 10 includes a gripper system 12 for retrieving storage cartridges located in any of the three storage magazines 4, 6 and 8, which are positioned on three sides of the picker mechanism along discrete directional axes that are illustrated in FIG. 2 as the "x" and "y" axes. The cartridge picker mechanism 10 is mounted for rotation about the "y" directional axis so that the gripper system is positionable to access each of the storage cell magazines. The "x" and "y" directional axes are mutually perpendicular. These directional axes may also be thought of as first and second directional axes, with the storage cell magazines 4 and 6 representing two first-axis storage cell magazines positioned on the first directional axis and the storage cell magazine 8 representing a second-axis storage cell magazine positioned on the second directional axis.

Figure 14:
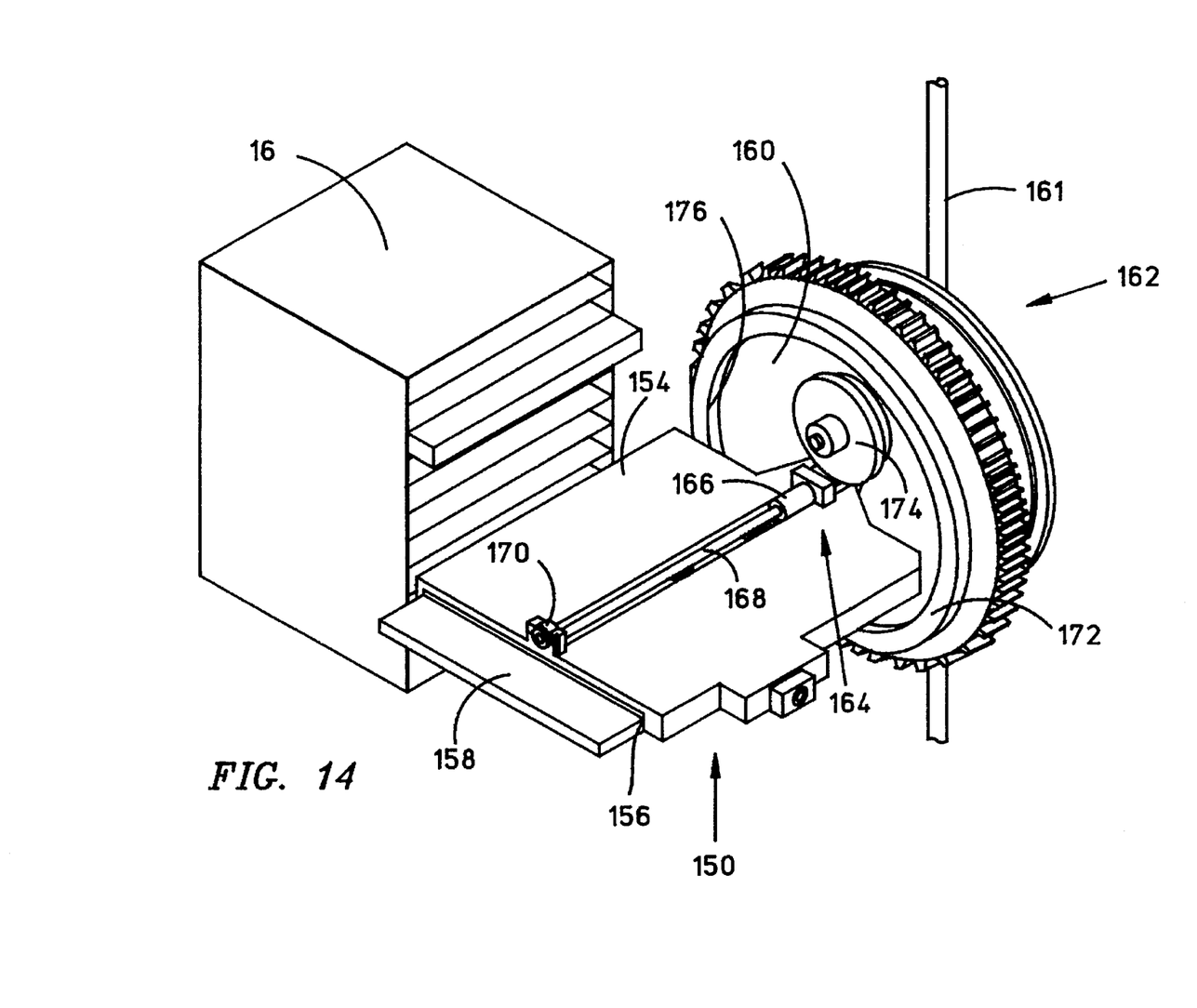
FIG. 14 is a perspective view of a picker mechanism for use in the data storage library of FIG. 2, showing a first side thereof.
Figure 15:
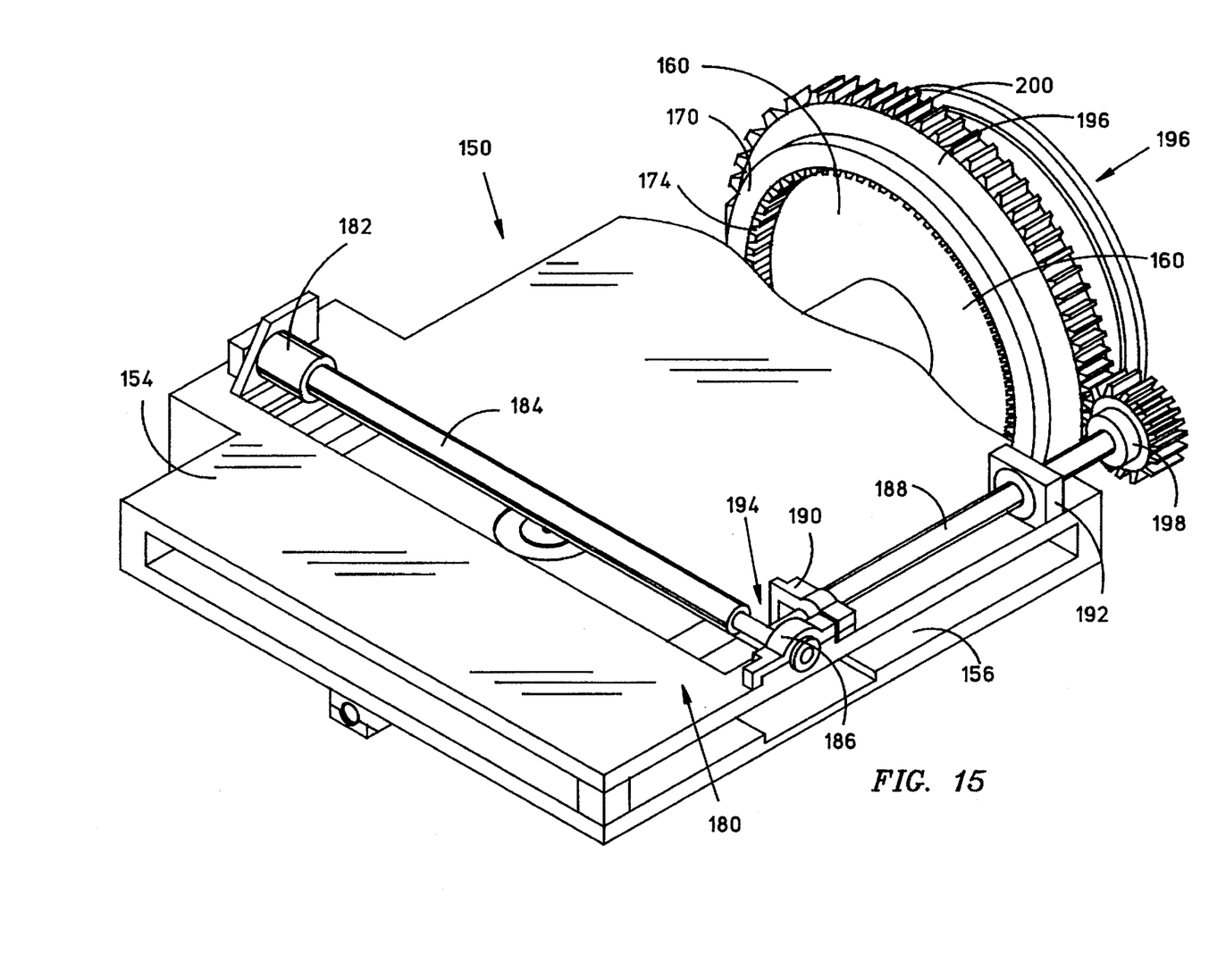
FIG. 15 is a perspective view of the picker mechanism of FIG. 14, showing a second side thereof.

The cartridge picker mechanism 10 includes a single cartridge chamber 14 having first and second closed sides 15 and 17, and opposing first and second open sides 16 and 18. The first open side 16 faces one of the first-axis storage cell magazines 4 or 6 (depending on the picker mechanism's rotational position), and the second open side 18 faces the second-axis storage cell magazine 8. The cartridge picker mechanism gripper system 12 includes first and second grippers 20 and 22 that are independently positionable toward the first and second open sides 16 and 18, respectively, in order to retrieve storage cartridges located in the storage cell magazines adjacent the first and second open sides. Typically, storage media cartridges will be stored in the data storage library 2 so that a media access end portion of each cartridge is oriented toward the positive direction of the "y" axis of FIG. 2. This orientation allows cartridges to be inserted in one or more peripheral data storage devices which, as indicated, may be positioned in the storage cell magazine 8. As a result of this cartridge orientation, the gripper 20 is preferably configured to grasp a side portion of the storage media cartridges to be retrieved, whereas the gripper 22 is configured to grasp an end portion of the storage media cartridges that is opposite the media access end portion thereof. In a preferred embodiment of the invention, the first gripper 20 is constructed in a manner shown in FIGS. 8 and 9, or alternatively, in FIGS. 10 and 11, as described in more detail below. In addition, those constructions could be utilized for the second gripper 22. In a further preferred embodiment, however, the second gripper 22 is constructed in a manner shown in FIGS. 12 and 13. A preferred embodiment of the picker mechanism itself is shown in FIGS. 14 and 15, and is described in more detail below.

Referring now to FIG. 3, the data storage library 2 may be enlarged to form a data storage library 32 by extending the library 2 along the second or "y" axis. The data storage library 2 is extended by repetition of the first axis storage cell magazines 4 and 6 to form columns 34 and 36 extending parallel to the second directional axis. The picker mechanism 10 is mounted to a transport device of conventional design (not shown) so as to be transversely positionable along the second directional axis to access each storage cell magazine of the storage cell magazine columns 34 and 36.

Figure 4:
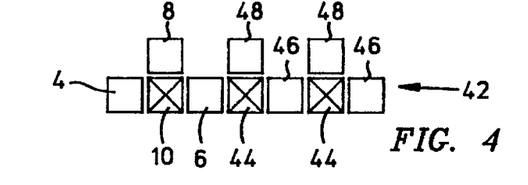
FIG. 4 is a plan view of an alternative data storage library utilizing the picker mechanism of FIG. 2.

Referring now to FIG. 4, the data storage library 2 may be enlarged to form a data storage library 42 by extending the library 2 along the first or "x" axis. The data storage library 2 is extended by repetition of the picker mechanism 10, the second axis storage cell magazine 8, and the first axis storage cell magazine 6 along the first directional axis such that adjacent sets of picker mechanisms 44 and first and second axis storage cell magazines 46 and 48 are created with the first axis storage cell magazines 46 being shared in adjacent sets.

Figures 5, 6:
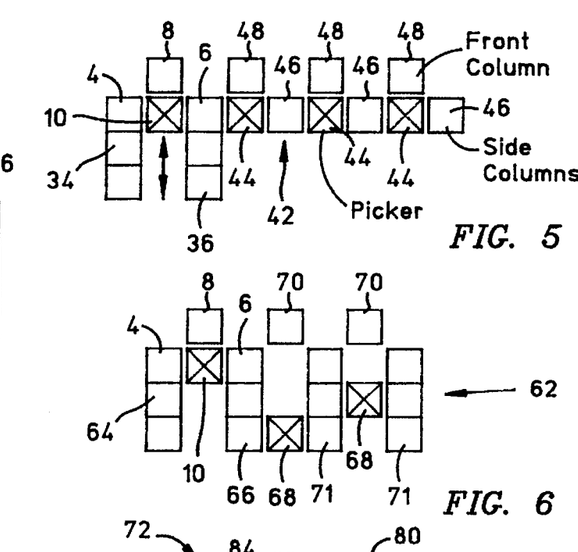
FIG. 5 is a plan view of an alternative data storage library utilizing the picker mechanism of FIG. 2.
FIG. 6 is a plan view of an alternative data storage library utilizing the picker mechanism of FIG. 2.

Referring now to FIG. 5, the data storage library 2 may be enlarged to form a data storage library 52 extended along the first and second directional axes by combining the data storage libraries 32 and 42 of FIGS. 3 and 4.

Referring now to FIG. 6, the data storage library 2 may be enlarged to form a data storage library 62 extended in the direction of the first and second directional axes. The data storage library 2 is extended in the direction of the second directional axis by repetition of the first axis storage cell magazines 4 and 6 to form columns 64 and 66 extending parallel to the second directional axis. The picker mechanism 10 is mounted to a transport device of conventional design (not shown) so as to be transversely positionable along the second directional axis to access each storage cell magazine of the storage cell magazine columns 64 and 66. The data storage library is extended in the direction of the first directional axis by repetition of the picker mechanism 10, the second axis storage cell magazine 8 and the first axis storage cell magazine column 66 along the first directional axis such that adjacent sets of picker mechanisms 68, second axis storage cell magazines 70 and storage cell magazine columns 71 are created with the storage cell magazine columns 70 being shared in adjacent sets.

Figure 7:
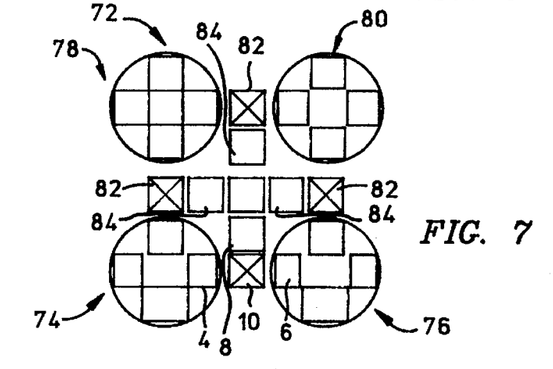
FIG. 7 is a plan view of an alternative dam storage library utilizing the picker mechanism of FIG. 2.

Referring now to FIG. 7, the data storage library 2 may be enlarged to form a data storage library 72. The data storage library 2 is extended by repetition of the first axis storage cell magazines 4 and 6 to form first and second rotatable magazine carousels 74 and 76 having plural storage cell magazines therein. Additionally, the data storage library 2 can be extended by repetition of the picker mechanism 10, the second axis storage cell magazine 8 and the first axis magazine carousels 74 and 76. That extension forms a system of four magazine carousels 74, 76, 78 and 80 arranged to form a square in which the second axis storage cell magazine 8 and the picker mechanism 10 are positioned between adjacent magazine carousels 74/76, and wherein a picker mechanism 82 and second axis storage cell magazine 84 are positioned between adjacent pairs of magazine carousel 76/80, 78/80 and 74/78. The second axis storage cell magazines 8 and 84 may contain one or more peripheral storage devices in communication with one or more host processing devices. The magazine carousels 74, 76, 78 and 80 are rotatable to permit access to each of the storage cell magazines therein by the picker mechanisms 10 and 82.

Figure 8:
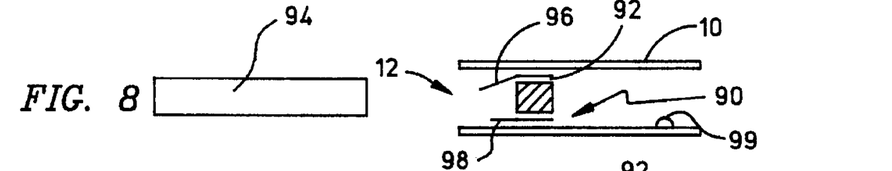
FIG. 8 is a side view of a gripper for use in the picker mechanism of FIG. 2.

Referring now to FIG. 8, the cartridge picker mechanism 10 of FIG. 2 may be constructed so that the gripper 20 (or the gripper 22) is a permanent magnet gripper 90. The permanent magnet gripper 90 includes a permanent magnet 92 adapted for magnetically attracting a metallic strip or the like, which can be positioned on a side portion of a storage media cartridge, such as the cartridge 94. The gripper 90 further includes a positionable separator formed from a resilient bendable arm 96 mounted on the magnet 92. The separator 96 is bendably positionable for selectively receiving the storage media cartridge 94 and repelling it to prevent magnetic attraction between the gripper 90 and the cartridge. Nominally, the separator 96 is located in the position shown in FIGS. 9A and 9B. A support lip 98 is further mounted to the magnet 92 to vertically support the cartridge while it is engaged with the gripper.

Figure 9A:
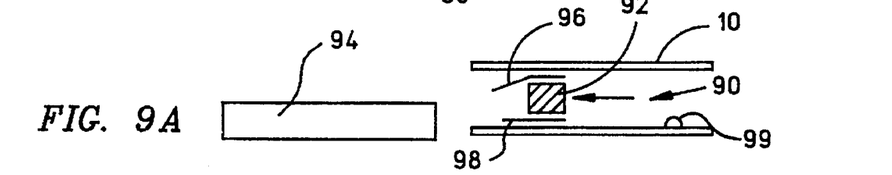
FIGS. 9A, 9B, 9C, 9D, 9E, 9F and 9G illustrate the operation of the gripper of FIG. 8.
Figure 9B:
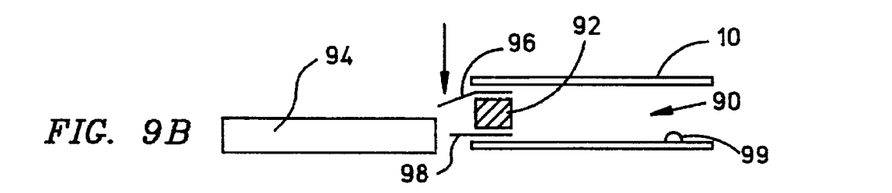
Figure 9C:
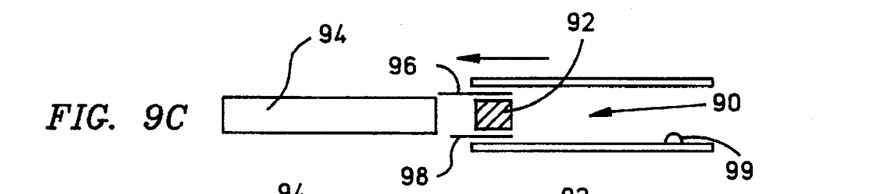
Figure 9D:
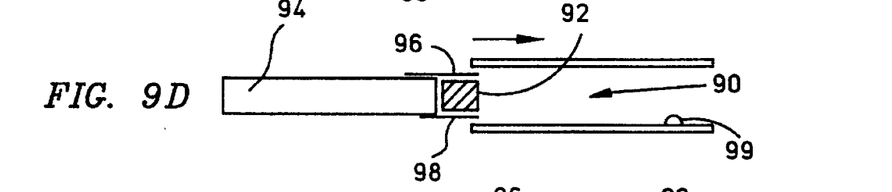
Figure 9E:
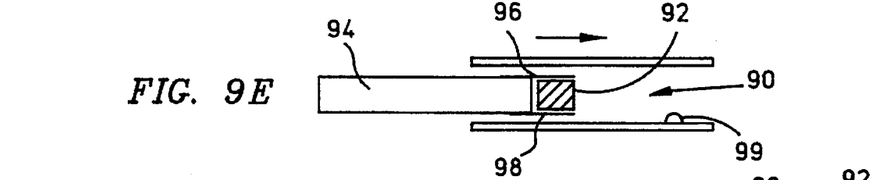
Figure 9F:
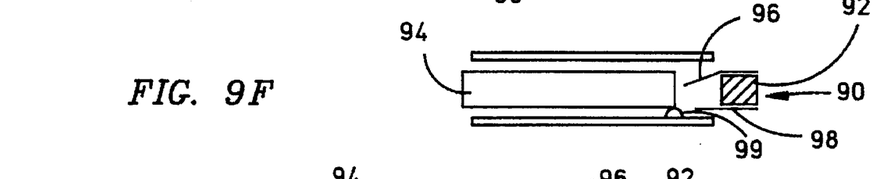
Figure 9G:
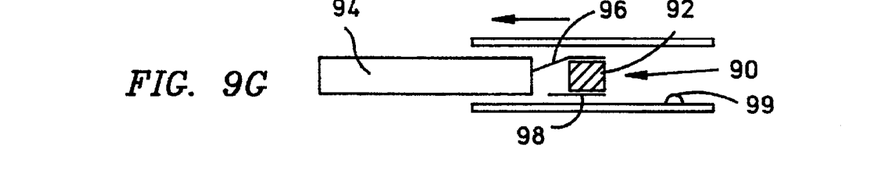

Referring now to FIGS. 9A–9G, the gripper 90 is slideably mounted in the picker mechanism 10 and positionable between a cartridge engagement position (shown by FIG. 9D) and a retracted position (shown by FIG. 9F). The picker mechanism 10 further includes a cartridge stop member 99 for engaging the cartridge 94 as the gripper 90 moves from its engagement position to its retracted position. The gripper 90 is positionable to retrieve the cartridge 94 from a storage cell location in one of the storage cell magazines 4 and 6 by first extending the gripper toward its engagement position with the picker mechanism 10 elevated so that the separator 96 is positioned above the cartridge 94, as shown in FIGS. 9A and 9B. To engage the cartridge 94, the picker mechanism 10 is translated vertically downwardly and the gripper is further extended until the permanent magnet 92 engages the cartridge 94 in the full gripper engagement position, as shown in FIGS. 9C and 9D. During this motion, the separator 96 deflects upwardly from its nominal position as it contacts the top of the cartridge 94. The gripper 90 is then returned to its retracted position, pulling the cartridge along with it. The gripper 90 disengages from the cartridge 94 as the cartridge contacts the cartridge stop member 99, and the separator 96 returns to its nominal undeflected position, as shown in FIGS. 9E and 9F. In order to return the cartridge 94 to a storage location, the gripper 90 is moved to its engagement position with the cartridge separator 96 located at its nominal position to repel the cartridge away from the gripper, as shown in FIG. 9G.

Figure 10:
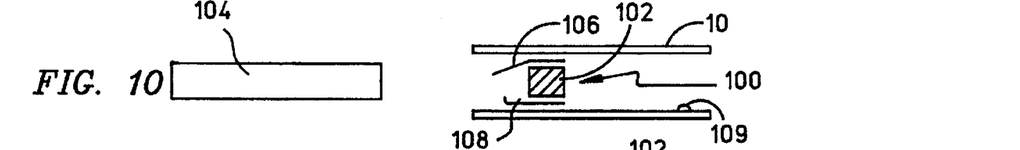
FIG. 10 is a plan view of a another gripper for use in the picker mechanism of FIG. 2.

Referring now to FIG. 10, the cartridge picker mechanism 10 of FIG. 2 may be constructed so that the gripper 20 (or the gripper 22) is a double lip gripper 100. The double lip gripper 100 includes a base 102 having a side portion thereof configured for engagement with a side portion of a storage media cartridge, such as the cartridge 104. A positionable separator, formed from a pivotable arm 106, is mounted to the base 102. The separator 106 is positionable for selectively receiving the storage media cartridge 104 and repelling it to prevent engagement of the gripper 100 and the cartridge. Nominally, the arm 106 is resiliently biased to the position shown in FIGS. 11A and 11B. A friction lip 108 is further mounted to the base 102 and configured to engage and grip the cartridge 104 for transport. The friction lip is pivotally mounted to the base 102 and resiliently biased to the nominal position shown in FIGS. 11A and 11B. In a preferred consruction, the friction lip may include a hook 110 for engaging a lip or ridge (not shown) that is conventionally formed adjacent the sides of storage media cartridges. In other constructions, the friction lip could be made from a high friction material that engages the cartridge 104 with sufficient force to pull it from a storage cell.

Figure 11A:
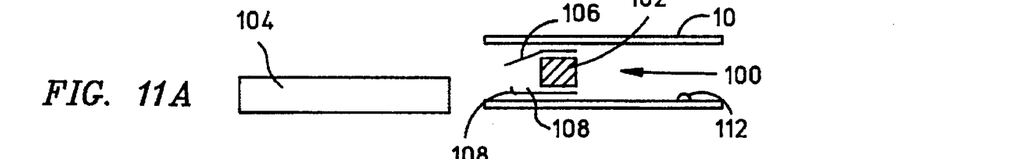
FIGS. 11A, 11B, 11C, 11D, 11E, 11F, 11G and 11H illustrate the operation of the gripper of FIG. 10.
Figure 11B:
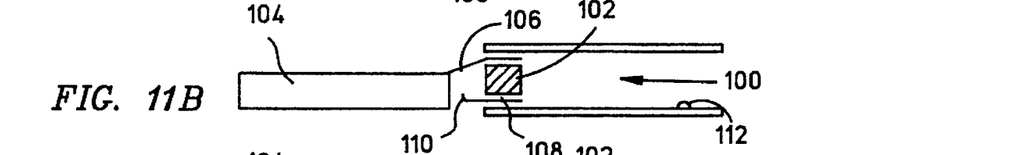
Figure 11C:
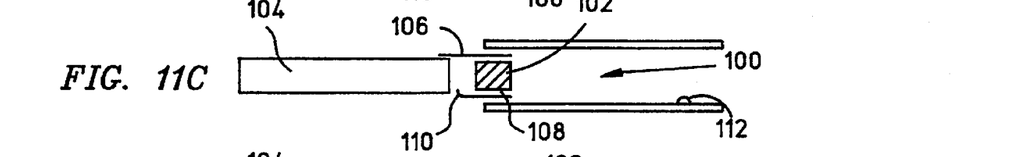
Figure 11D:
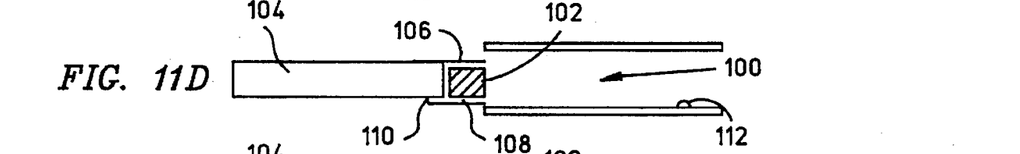
Figure 11E:
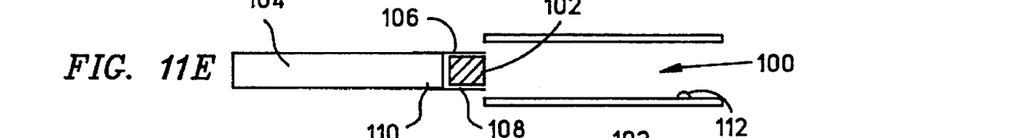
Figures 11F, 11G:
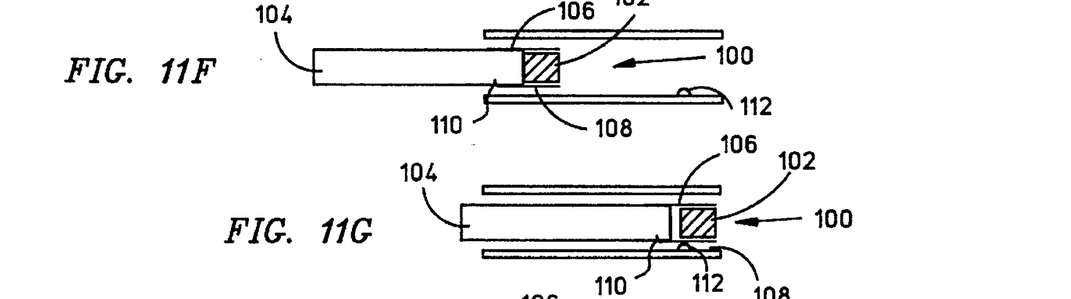
Figure 11H:
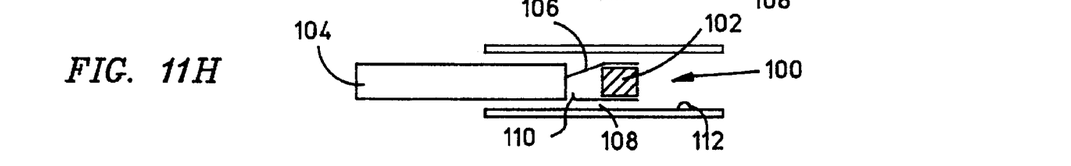

Referring now to FIGS. 11A–11H, the gripper is slideably mounted in the picker mechanism 10 and positionable between a cartridge engagement position (shown by FIG. 11D) and a retracted position (shown by FIG. 11G). The picker mechanism 10 further includes a cartridge stop member 112 for engaging the pivotable friction lip 108 and the cartridge 104 as the gripper moves from its engagement position to its retracted position. The gripper 100 is positionable to retrieve the cartridge from a storage cell location by first extending the gripper toward its engagement position with the picker mechanism elevated so that the separator 106 is positioned above the cartridge 104, as shown in FIGS. 11A and 11B. To engage the cartridge 104, the picker mechanism 10 is translated vertically downwardly and the gripper is further extended until the friction lip 108 fully engages the cartridge 104, as shown in FIGS. 11C and 11D. During this motion, the separator 106 pivots upwardly from its nominal position as it contacts the top of the cartridge 104. The gripper 100 is then returned to its retracted position and is disengaged from the cartridge 104 as the separator 106 and the cartridge contact the cartridge stop member 112, as shown in FIGS. 11F and 11G. Cartridge disengagement occurs as a result of two actions. First, the stop member 112 pivots the friction lip 108 from its nominal position so that the hook 110 (or a high friction surface of the lip) releases the cartridge 104, as shown in FIG. 11G. The cartridge 104 also comes into contact with the stop member 112, which prevents further cartridge retraction. As the gripper 102 continues its retraction, the separator 106 disengages from the cartridge 104 and pivots to its nominal position. In order to return the cartridge 104 to a storage location, the gripper 100 is moved to its engagement position with the cartridge separator 106 located at its nominal position to repel the cartridge 104 away from the gripper, as shown in FIG. 11H.

Figure 12:
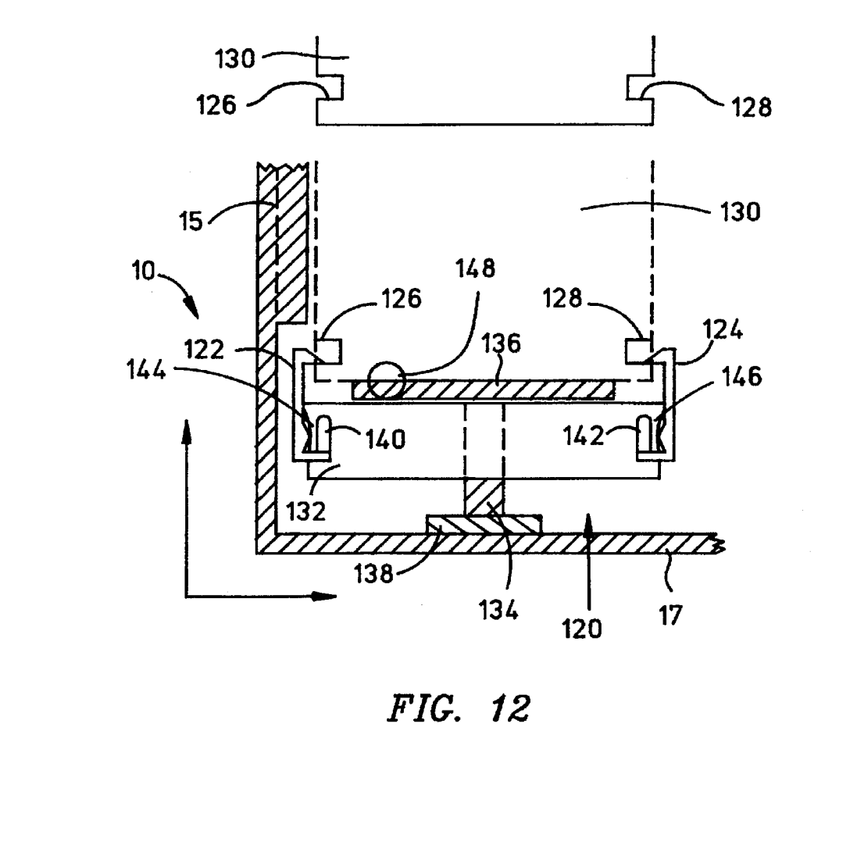
FIG. 12 is a plan view of another gripper for use in the picker mechanism of FIG. 2.
Figure 12A:
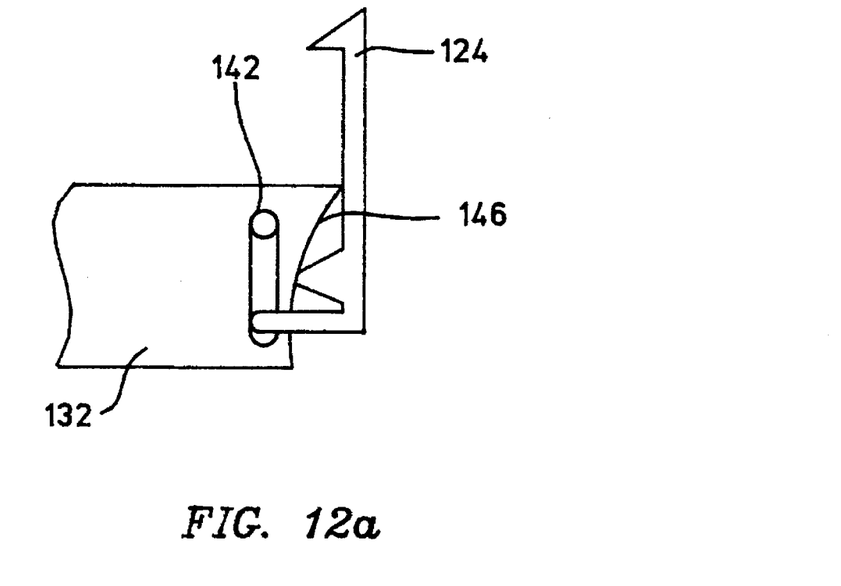
FIG. 12a is a detailed view of the structural relationship between the cam surfaces 144, 146 and the gripper arms 122 and 124 in a first position.
Figure 13:
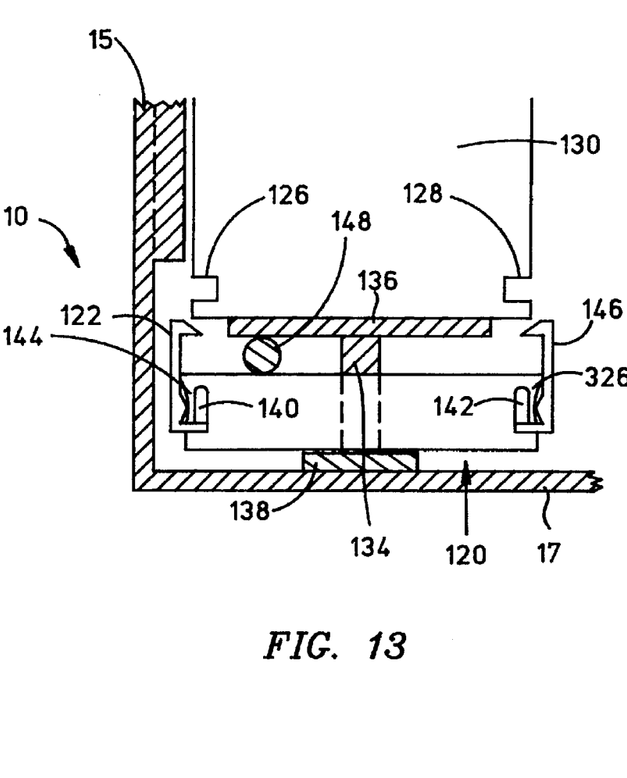
FIG. 13 is another plan view of the gripper of FIG. 12.
Figure 13A:
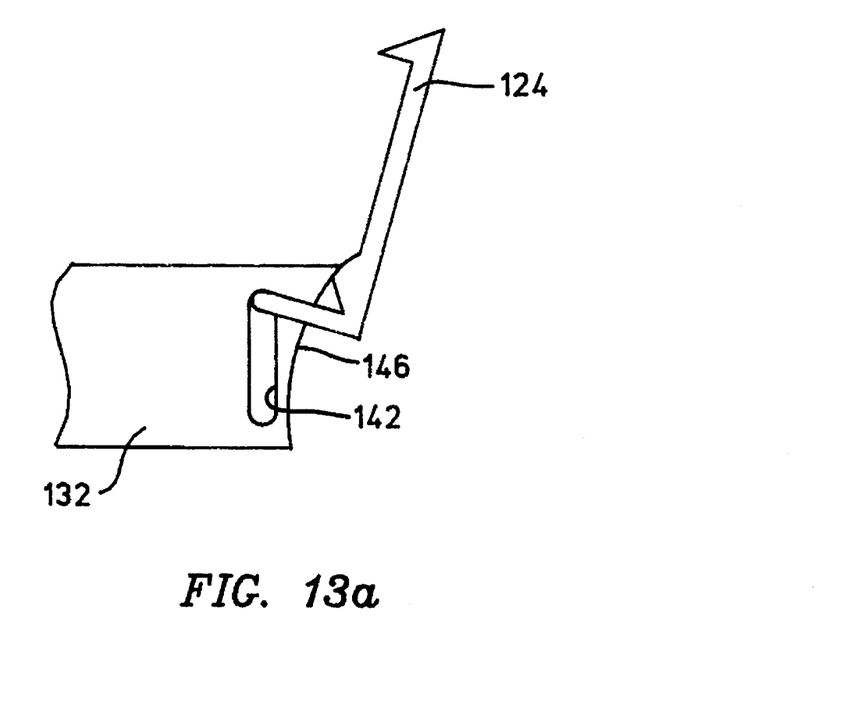
FIG. 13a is a detailed view of the structural relationship between the cam surfaces 144, 146 and the gripper arms 122 and 124 in a second extended position.

Referring now to FIGS. 12 and 13, the cartridge picker mechanism 10 of FIG. 2 may be constructed so that the gripper 22 for accessing storage media cartridges in the storage cell magazines 8 is a releasable action gripper 120. The gripper 120 is mounted for slidable movement between the first and second ends 17 and 18 of the picker mechanism 10, shown in FIG. 2. The gripper includes a pair gripper arms 122 and 124 for releasably engaging a pair of notches 126 and 128 formed in the sides of a storage media cartridge 130, adjacent an end portion thereof that is opposite the cartridge media access end portion. The gripper 120 further includes a main carrier 132 to which the gripper arms 122 and 124 are pivotally mounted, and a gripper arm disengagement system for disengaging the gripper arms 122 and 124 when the gripper 120 is retracted to the first cartridge chamber end 17.

The disengagement system includes a cartridge stop member 134 slideably mounted to the main carrier 132. The cartridge stop member 134 has a first stop element 136 for engaging the storage media cartridge 130 and a second stop element 138 for engaging the first cartridge chamber end 17. The stop member 134 stops the retraction of the storage media cartridge 130 in the cartridge chamber while the main carrier 132 is positionable to continue its retraction toward the first cartridge chamber end 17. The disengagement system further includes a cam system for pivotally disengaging the gripper arms 122 and 124 from the storage media cartridge in response to the main carrier 132 being slideably positioned relative to the cartridge stop member 134. The cam system includes the main carrier 132 having a pair of slots 140 and 142 within which the gripper arms 122 and 124 are pivotally mounted. The slots 140 and 142 allow the main carrier 132 to retract from the storage media cartridge 130 while the gripper arms 122 and 124 remain initially engaged with the cartridge. Thereafter, however, a pair of outwardly flaring side surface portions 144 and 146 of the main carrier 132 urge the gripper arms 122 and 124 outwardly as the main carrier retracts from the storage media cartridge. As the main carrier 132 retracts from the cartridge 130, a resiliently biased lock pin 148 inserts itself between the main carrier 132 and the stop element 136. The lock pin 148 retains the main carrier 132 in its retracted position without power utilization until reengagement with the cartridge 130 is required. At that time, the lock pin 148 is removed from the gap.

Referring now to FIGS. 14 and 15, a picker mechanism 150 illustrates a preferred construction of the picker mechanism 10 of FIG. 2. The picker mechanism is shown in FIG. 14 to be adjacent a storage cell magazine 152, which corresponds to one of the storage cell magazines 4 and 6 of FIG. 2. Other storage cell magazines could also be positioned adjacent the picker mechanism 150 in accordance with FIG. 2, but are not shown in FIG. 14 for clarity. The picker mechanism 150 includes a housing 154 having an interior chamber 156 for holding a storage media cartridge 158. The housing 154 is supported on a vertical drive mechanism, such as the drive mechanism E of FIG. 1, having a support hub 160 and a vertical drive element 161. A gripper drive system is mounted on the housing 154 for controllably positioning a pair of grippers. The gripper drive system includes a gear mechanism 162 which used to selectively engage and position the grippers as will now be described.

FIG. 14 illustrates the components of the gripper drive system used for positioning a gripper mechanism 164. The gripper mechanism 164 corresponds to the gripper 22 of FIG. 2 and is used to transport storage media cartridges to the storage cell magazines 8. The gripper mechanism 164 includes internal gripper components such as the releasable action gripper of FIGS. 12 and 13. An internally threaded gripper drive element 166 extends from the interior 156 of the picker housing 154 where it is engaged with an externally threaded drive shaft member 168. The drive shaft member 168 is supported for rotation on the housing 154 in a journal bearing assembly 170 located at one end of the housing and in the internally threaded portion of the drive element 166 at the opposite end of the housing. The drive shaft member 168 is further connected to a ring gear 172 via an intermediate pinion gear 174. Both the ring gear 172 and the pinion gear 174 can be mounted, directly or indirectly, on the hub 160, although other mounting schemes could also be used. The pinion gear 174 engages a set of inner gear teeth 176 (shown more clearly in FIG. 15) of the ring gear 172. The pinion gear also engages a drive shaft gear (not shown) mounted on the drive shaft member 168 for transferring power from the ring gear to the drive shaft member. In order to control the rotation of the ring gear 172, it can be mounted on a support axle (not shown) which is independently mounted for rotation about the hub 160 and controllably driven by a power source (not shown) such as a drive belt connected to a motor that powers the vertical drive mechanism. Other power systems could also be used.

As power is applied to the drive shaft member 168, its rotation causes the threadably mounted gripper drive element 166 to translate between the end portions of the housing 154. A slot in the housing 154 provides a path for the gripper drive element 166 as it is driven by the drive shaft member 168. It will be seen from FIG. 14 that the gripper drive element 166 is positionable from a gripper retraction position adjacent the ring and pinion gears 172 and 174 to an extended position at the opposite end of the housing 154. In that way, the storage media cartridge 158 can be transported between the picker mechanism 150 and the storage cell magazine 8. It will also be observed from FIG. 14 that the picker mechanism 150 can be inverted or "flipped" using the gear mechanism 162. Picker mechanism inversion is implemented by translating the gripper drive element 166 to its fully retracted position. A stop element or detent (not shown) is provided at that position to prevent further retraction of the drive element. To invert the picker mechanism 150, the gear mechanism 162 is activated to apply continued retraction power. Because of the stop element, however, the gripper drive element 166 does not retract and instead transfers power to the housing 154, causing it to rotate.

Referring now to FIG. 15, the picker mechanism 150 is shown on the side opposite that shown in FIG. 14. FIG. 15 illustrates the components 180 of the gripper drive system 162 used for positioning a gripper mechanism corresponding to the gripper 20 of FIG. 2, which is used to transport storage media cartridges to the storage cell magazines 4 and 6. The gripper mechanism includes internal gripper components such as the permanent magnet gripper of FIGS. 8 and 9A–9G, or the double lip gripper of FIGS. 10 and 11A–11H. An internally threaded gripper drive element 182 extends from the interior 156 of the picker mechanism 150 where it is engaged with an externally threaded drive shaft member 184. The drive shaft member 184 is supported for rotation on the housing 154 in a journal bearing assembly 186 located at one side of the housing and in the internally threaded portion of the drive element 182 at the opposite side of the housing. The drive shaft member 186 is further connected to a second drive shaft member 188. The drive shaft member 188 is supported for rotation on the housing 154 in a pair of journal bearing assemblies 190 and 192. The drive shaft members 184 and 188 are interconnected by a bevel gear arrangement 194. The drive shaft member 188 is further connected to a large pinion gear 196 via an intermediate pinion gear 198. Both of the pinion gears 196 and 198 can be mounted, directly or indirectly, on the hub 160, although other mounting schemes could also be used. The pinion gear 198 engages a set of outer gear teeth 200 of the pinion gear 196. The pinion gear 198 is mounted at the end of the drive shaft member 188 and transfers power from the pinion gear 196 to the drive shaft member. In order to control the rotation of the pinion gear 196, it can be mounted on a support axle (not shown) which is independently mounted for rotation about the hub 160 and controllably driven by a power source (not shown) such as drive belt connected to a motor that powers the vertical drive mechanism. Other power systems could also be used.

As power is applied to the drive shaft members 188 and 184, their rotation causes the threadably mounted gripper drive element 182 to translate between the side portions of the housing 154. A slot in the housing 154 provides a path for the gripper drive element 182 as it is driven by the drive shaft members. It will be seen from FIG. 15 that the gripper drive element 182 is positionable from a gripper retraction position adjacent one side of the housing 154 to an extended position at the opposite side of the housing 154. In that way, a storage media cartridge, such as the cartridge 158 in FIG. 14, can be transported between the picker mechanism 150 and the storage cell magazines 4 and 6, depending on whether the picker mechanism 150 is upright or inverted.

Accordingly, an extendable data storage library utilizing a double gripper picker mechanism has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. A data storage library comprising:
   a picker assembly including:
      a picker casing having top and bottom sides which are bounded laterally by right, left, front and back sides, each of the right and left sides being bisected by a horizontally oriented x axis and each of the front and back sides being bisected by a horizontally oriented y axis, the x and y axes being perpendicular with respect to one another so as to define an x-y horizontal plane which is perpendicular to a vertically oriented z axis;
      first and second gripper devices mounted in the picker casing wherein each gripper device is capable of gripping a cartridge, the first gripper device reciprocably movable parallel to the x axis and the second gripper device reciprocably movable parallel to the y axis;
      one of the front and back sides of the picker casing having a first casing opening for receiving said cartridge within said picker casing and one of the right and left sides of the picker casing having a second casing opening for receiving said cartridge within said picker casing, and
      first and second translation means reciprocably moving the first and second gripper devices respectively parallel to the x and y axes respectively in a common plane with respect to one another so that said cartridge can be received or ejected from the picker casing through either the first casing opening or the second casing opening without moving from said common plane;
   means for reciprocably moving the picker casing along said z axis;
   first, second and third columns of cartridge receptacles, each column having a plurality of vertically stacked cartridge receptacles with openings along a vertical receiving side of the column;
   the first column being located adjacent the picker casing with its vertical receiving side facing said first casing opening as the picker casing is moved along said z axis so that said cartridge can be transferred between a receptacle in the first column and the picker casing;
   the second and third columns being located adjacent the picker casing with their vertical receiving sides facing the right and left sides respectively of the picker casing as the picker casing is moved along said z axis so that said cartridge can be transferred between a receptacle in either of the second and third columns and the picker casing, depending upon the location of said second casing opening;
   means for flipping the picker casing about the y axis so that the first gripper device can be positioned to grip said cartridge from a receptacle in either of the second or third columns; and
   said first and second translation means including:
      one of the top and bottom sides of the picker casing having a first slot which extends parallel to said x axis and the other of the top and bottom sides of the picker casing having a second slot which extends parallel to said y axis;
      first and second lead screws rotatably mounted to the picker casing with the first lead screw extending parallel to said x axis opposite said first slot and the second lead screw extending parallel to said y axis opposite said second slot;
      first and second nuts connected to the first and second grippers respectively and extending transversely through the first and second slots respectively;
      the first nut being threaded to the first lead screw so that upon selective rotation of the first lead screw the first gripper reciprocably moves within the casing parallel to said x axis and adjacent the first slot and the second nut being threaded to the second lead screw so that upon selective rotation of the second lead screw the second gripper reciprocably moves within the casing parallel to said y axis and adjacent the second slot; and
      the reciprocable movements of the first and second grippers being within said common plane.

2. A data storage library as claimed in claim 1 wherein each gripper device has two releasable action grippers which cooperate with one another to grip said cartridge.

3. A data storage library as claimed in claim 2 wherein each of the second and third columns is replicated from said second and third columns respectively one or more times parallel to said y axis in a direction away from the first column.

4. A data storage library as claimed in claim 2 wherein the picker assembly and the first and second columns are replicated from said second column one or more times parallel to the x axis away from said third column.

5. A data storage library as claimed in claim 4 wherein each of the second and third columns is replicated from said second and third columns respectively one or more times parallel to said y axis in a direction away from the first column.

6. A data storage library as claimed in claim 5 wherein at least one of said columns has a receptacle which contains a peripheral storage device which is in communication with a host data processing device.

* * * * *

UNITED STATES PATENT AND TRADEMARK OFFICE
CERTIFICATE OF CORRECTION

PATENT NO.   :  5,631,785
DATED        :  May 20, 1997
INVENTOR(S)  :  Dang et al It is certified that error appears in the above-indentified patent and that said Letters Patent is hereby corrected as shown below:

Title page, item [56] add the following references:

| | | | |
|---|---|---|---|
| 3,880,294 | 04/29/75 | Arseneault | 214/1B |
| 3,956,768 | 05/11/76 | Covington | 360/92 |
| 4,173,427 | 11/06/79 | Beuch et al | 414/751 |
| 4,226,570 | 10/07/80 | Holecek et al | 414/751 |
| 4,462,742 | 07/31/84 | Hradel | 414/280 |
| 4,815,055 | 03/21/89 | Fago, Jr. | 369/36 |
| 5,144,506 | 09/01/92 | Sahota | 360/92 |

Foreign Patent Documents

| | | |
|---|---|---|
| JP4-157659 | 29.5.1992 | Japan |
| JP2-302958 | 14.12.1990 | Japan |
| JP2-94158 | 04.04.1990 | Japan |
| JP1-178160 | 14.07.1989 | Japan |
| JP57-135477 | 21.08.1982 | Japan |

Signed and Sealed this

Twenty-fifth Day of July, 2000

Attest:

Q. TODD DICKINSON

Attesting Officer

Director of Patents and Trademarks